Figure 1:
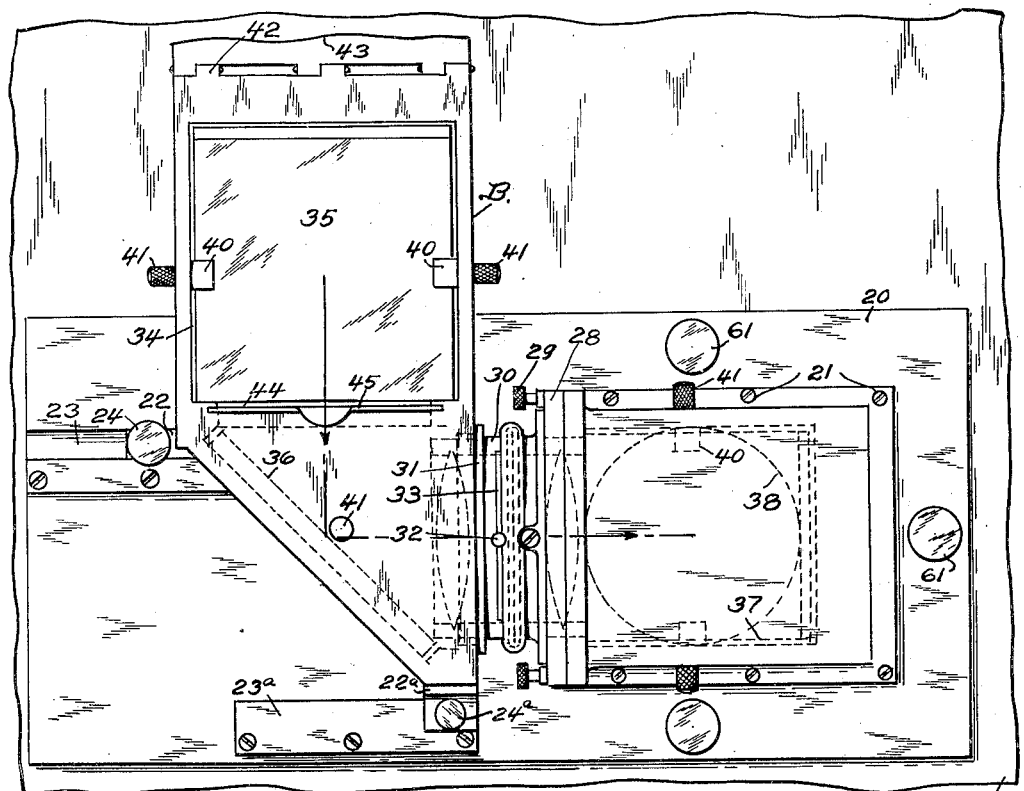

May 12, 1942.  W. C. HUEBNER  2,282,656
IMAGE REVERSER FOR CAMERAS
Filed Jan. 24, 1941   5 Sheets-Sheet 1

INVENTOR
William C. Huebner
By Joseph Harris
ATTORNEY

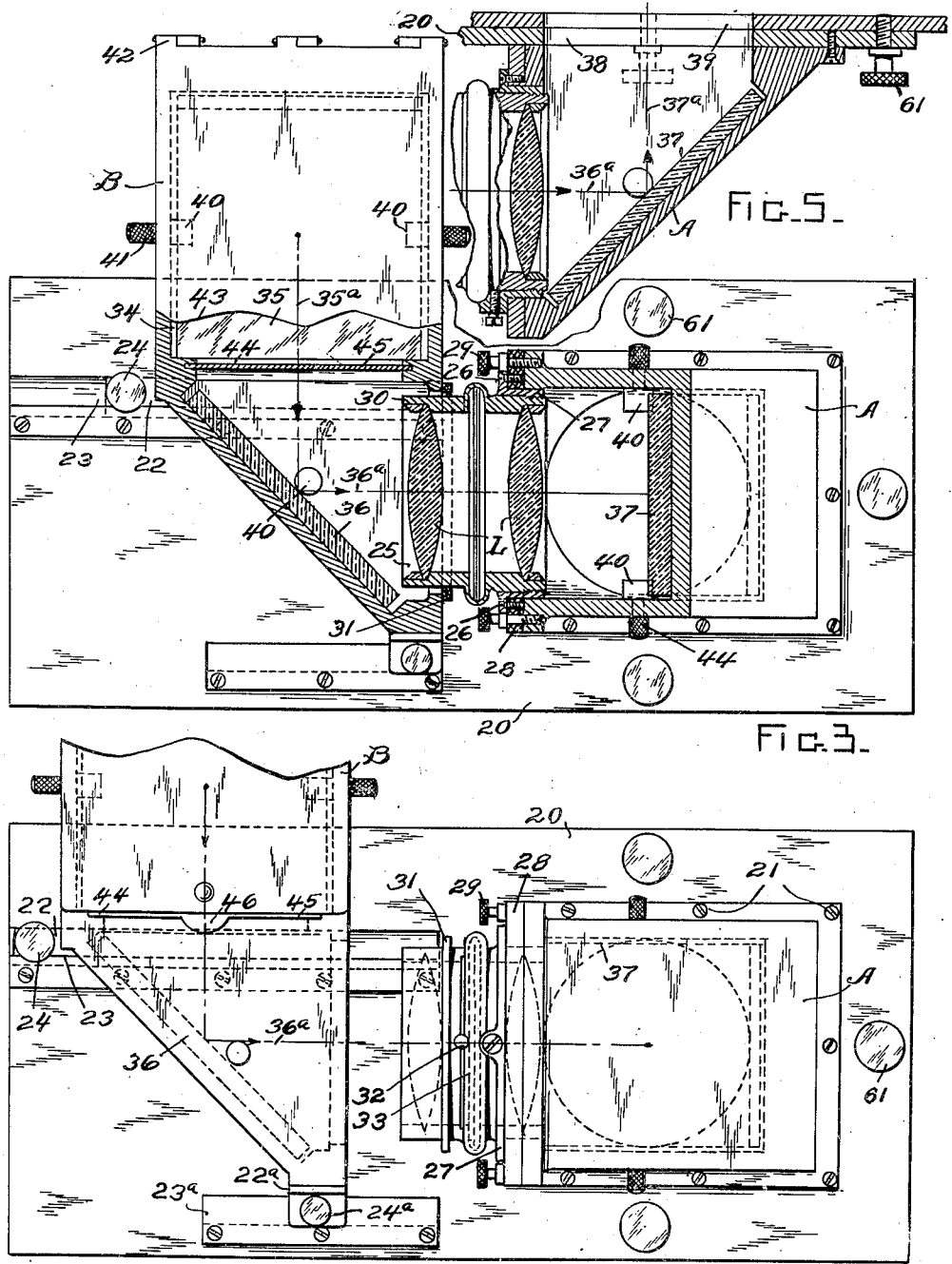

May 12, 1942.  W. C. HUEBNER  2,282,656
IMAGE REVERSER FOR CAMERAS
Filed Jan. 24, 1941  5 Sheets-Sheet 3

INVENTOR
William C. Huebner
BY Josife Harris
ATTORNEY

May 12, 1942. W. C. HUEBNER 2,282,656
IMAGE REVERSER FOR CAMERAS
Filed Jan. 24, 1941 5 Sheets-Sheet 4

INVENTOR
William C. Huebner
Joseph Harris
ATTORNEY

Patented May 12, 1942

2,282,656

UNITED STATES PATENT OFFICE 2,282,656

IMAGE REVERSER FOR CAMERAS

William C. Huebner, New York, N. Y.

Application January 24, 1941, Serial No. 375,782

3 Claims. (Cl. 88—74)

This invention relates to improvements in image reverser for cameras and, more especially, image reverser for straight line process camera work in connection with the production of press plates for offset printing. The present invention is in the nature of an improvement on the image reverser disclosed and claimed in my co-pending application 321,014 filed February 27, 1940, and to which reference may be had for certain details not deemed necessary to be incorporated in the present application.

As pointed out in said application 321,014 there are certain disadvantages inherent in the usual methods heretofore employed in obtaining negatives for use in the preparation of press plates for offset presses. For instance, in the prism method of obtaining reversed images on negatives, it is practically impossible to obtain the necessary degrees of enlargement or reduction often required in commercial practice and in the other common method wherein the positives are obtained from photographing the initial ordinary negative, the desired sharpness and clearness of the images obtainable ultimately on the press plates is practically impossible to obtain.

The straight line image reverser of my said earlier application 321,014, while overcoming the disadvantages of the common methods theretofore employed has, however, been found to require certain improvements in order to meet all of the practical problems arising commercially in the use of such an image reverser in the wide variations of conditions encountered in different types of work, such as the problems of enlargments and reductions, and, specifically, the use of lenses of different focal lengths.

One object of the present invention therefore is to provide a straight line image reverser of the type hereinbefore referred to such that, by mere change of position of the image reverser on the usual lens board of the camera, the same can be used effectively for either reductions or enlargements within all practical ranges required for commercial purposes.

Another object of the present invention is to provide an image reverser for process cameras wherein provision is made for easily and interchangeably holding accurately and squarely all commercial lenses of various focal lengths to the end that the reverser may be quickly adapted to every varying photographic requirement.

Under some conditions in the practical use of an image reverser, it frequently becomes desirable or necessary for the center of the copy to be above or below or to either side of the center line from the copy to the lens board and another object of the invention therefore is to provide an image reverser and mounting therefor such that the reverser may be located at any given point of a circle around said center line to thereby meet particular reproduction requirements.

More specifically the present invention comprises an image reverser employing three reflecting mirrors in conjunction with a lens. The lens is located between and closely adjacent two of the mirrors so that when the reverser is used in one position, the picked up image of the copy will be reflected twice before passing through the lens and once after leaving the lens, as for certain enlargements whereas, in another position of the reverser, the picked up image from the copy will be reflected once only before passing through the lens and twice after leaving the lens, as for certain reductions, the entire assembly of mirrors and lens being mountable on either the outer or inner side of the lens board.

The invention further contemplates, in an image reverser of the character indicated in the preceding paragraph, means whereby the lens can readily be interchanged for other commercial lenses of different focal lengths.

Other specific objects of the invention are to provide means for trapping stray or ghost images; to employ an exposure shutter for the image reverser which shutter also serves to protect the reflecting mirror surfaces when the reverser is not in use; and to proportion the reflecting surfaces so that larger images can be obtained or larger areas covered by bringing the reflectors as close as possible to and immediately adjacent the lens.

Other objects of the invention will more closely appear from the description and claims hereinafter following.

Figure 2:
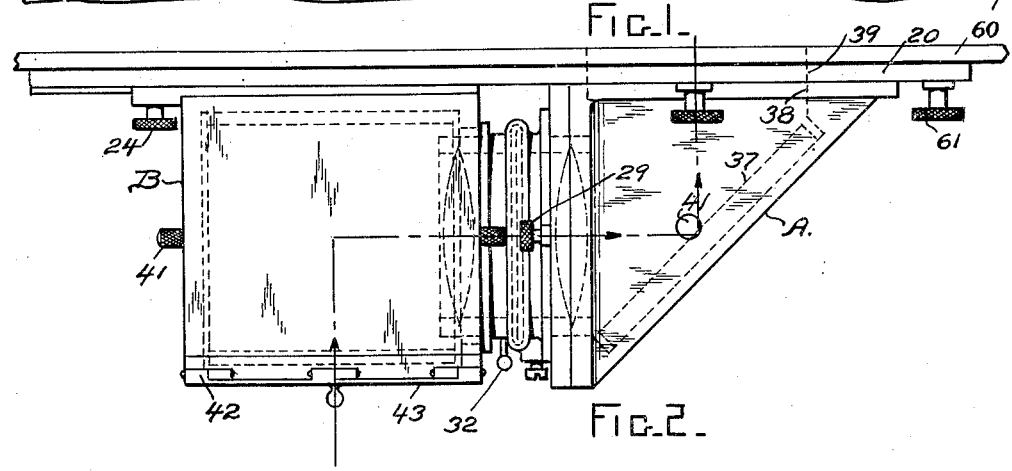
Figure 6:
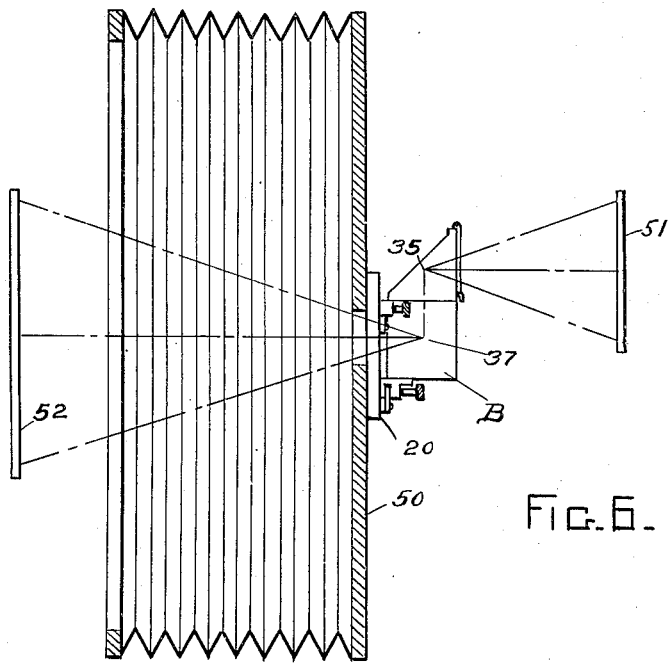
Figure 7:
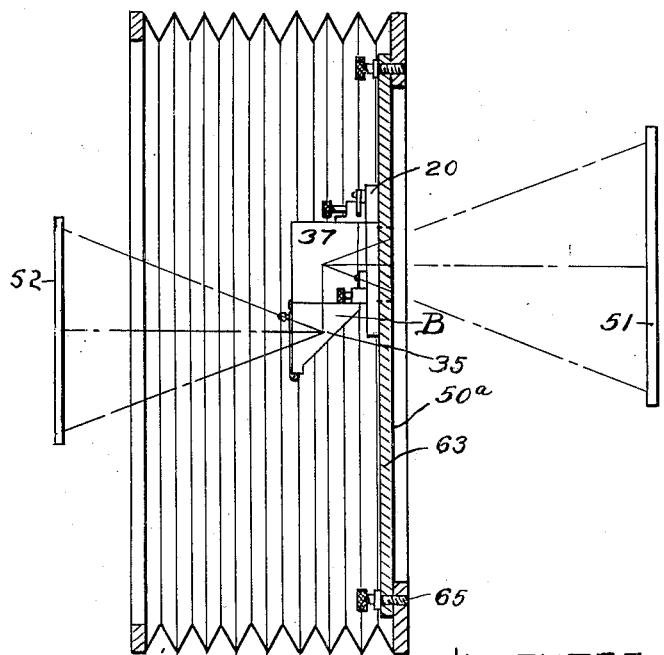
Figure 8:
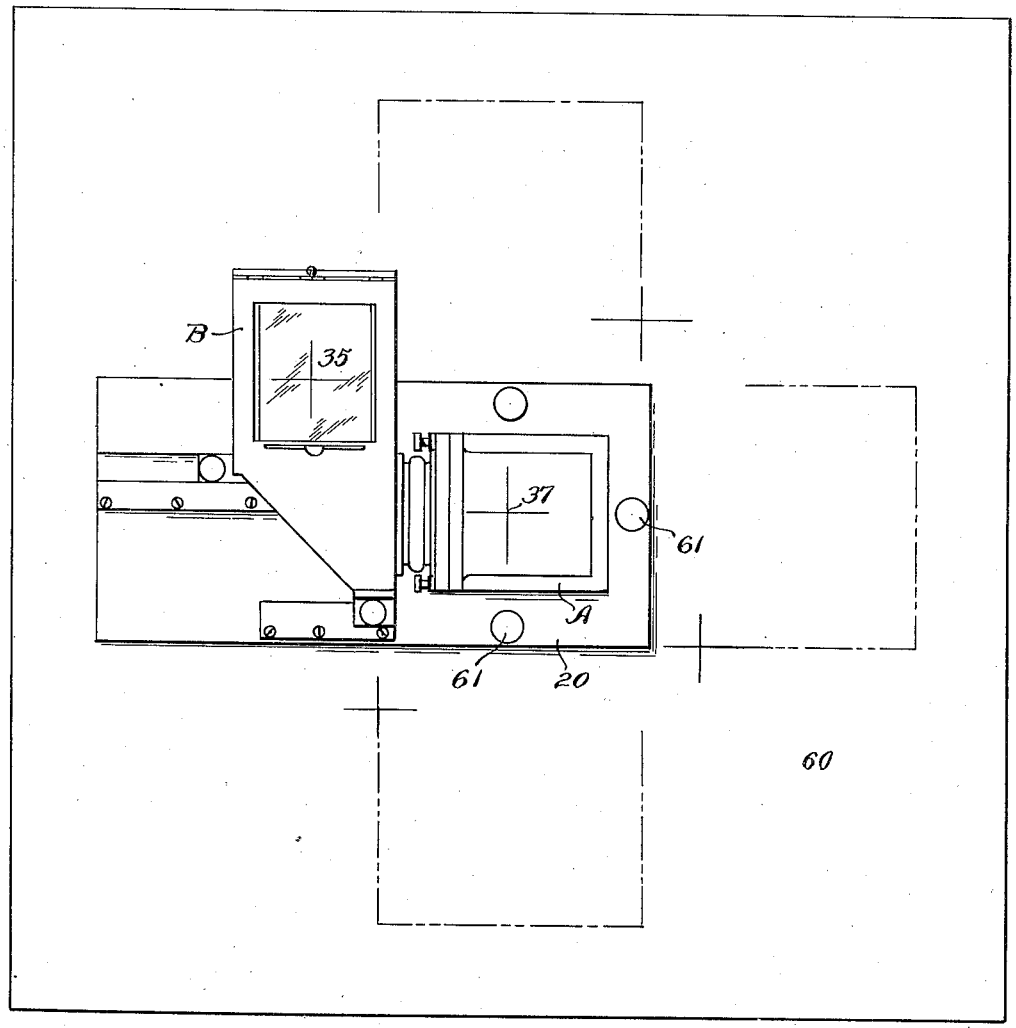
Figure 9:
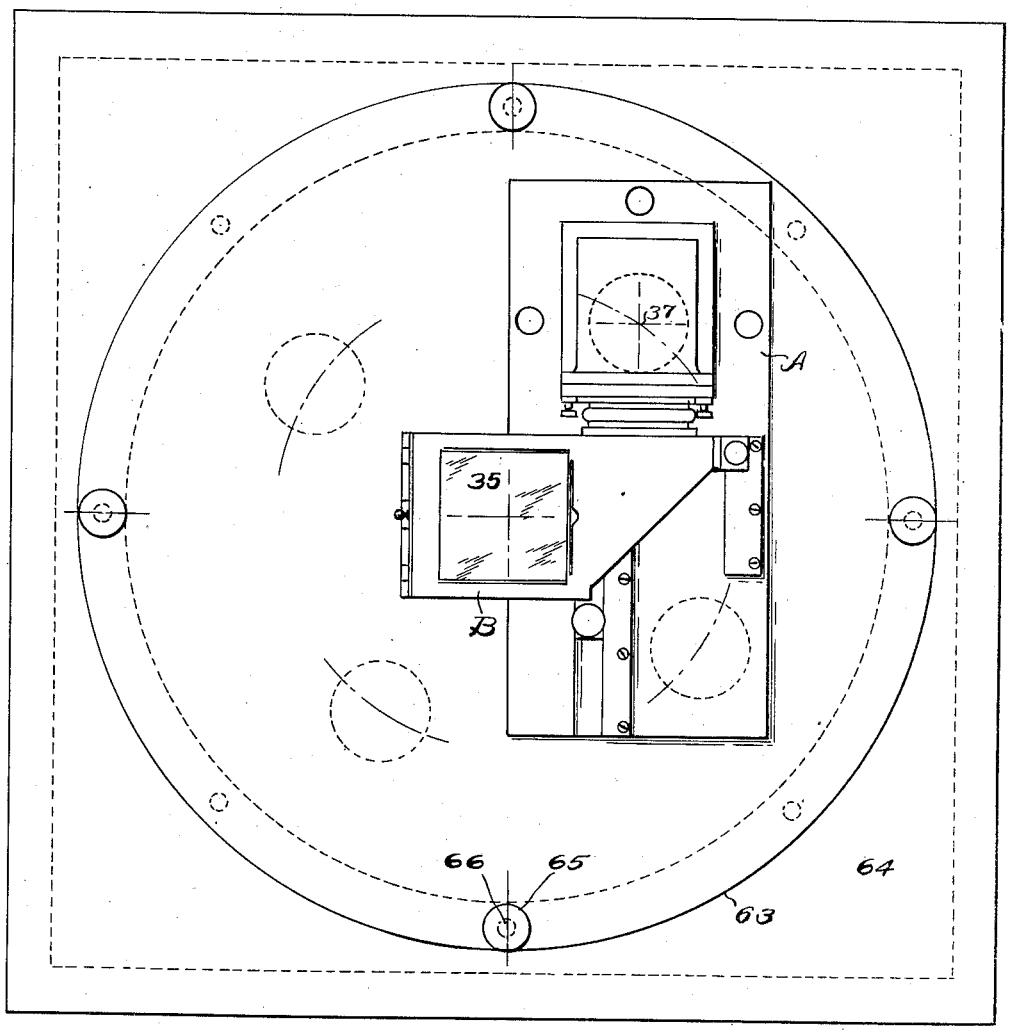

In the drawings forming a part of this specification, Figure 1 is a front elevational view of the improved image reverser showing the same secured to a reverser mounting; parts being broken away in order to better accommodate the view on the sheet. Figure 2 is a top plan view of the reverser shown in Figure 1. Figure 3 is a view similar to Figure 1 but with certain portions of the reverser shown in vertical section, more particularly the intermediate mirror, lens, and one of the end mirrors. In this figure, the reverser mounting is omitted. Figure 4 is a view similar to Figure 2 but illustrating one of the sections or elements of the reverser housing moved away from the other in order to provide the necessary clearance for removing and interchanging the lens and barrel. Figure 5 is a horizontal sectional view of that portion of the reverser which appears at the right hand end of Figures 1, 2, 3, and 4. Figure 6 is a schematic or diagrammatic view illustrating more particularly the use of the improved image reverser when applied to the front or outer side of the usual camera lens board. Figure 7 is a view similar to Figure 6 but illustrating the use of the improved reverser on the inner or back side of the usual camera lens board. Figure 8 is a more or less diagrammatic view illustrating the improved image reverser on the reverser mounting and the manner in which the reverser may be angularly adjusted to any point in a circle around the center line extending from the copy to the lens board. Figure 8 illustrates one position in full lines and three other positions in dotted lines. And Figure 9 is a view similar to Figure 8 illustrating different positions that may be taken by the reverser angularly about a center corresponding to the center line from the copy to the lens board of the camera, Figure 9 differing from Figure 8, however, in that the image receiving or incident mirror of the reverser has its center corresponding to the said center line and the emitted image being off center, whereas in Figure 8 the emitted image is transmitted through the lens board to the negative at the center of the lens board and the incident mirror is off center.

Referring first to the construction as illustrated Figures 1 to 5 inclusive, the improved image reverser is shown as preferably mounted on what may be termed a reverser mounting or base 20 of any suitable shape, that shown being of generally rectangular outline.

The reverser proper comprises, preferably, two housing sections or units designated broadly by the reference characters A and B. The unit A is directly secured to the reverser mounting or board 20 by screws 21 as shown. The board 20 is also provided with a fixed guide 23 extending horizontally and disposed to the left of the housing unit A, as viewed in Figures 1, 3, and 4. Slidably disposed in guide 23 is a relatively heavy flange 22 rigid or otherwise fixed with respect to the housing unit B so that, as will be obvious, the unit A may be adjusted back and forth relative to the unit A. The unit B is adapted to be locked in any desired adjusted position by means of lock screw 24 extending through the flange 22. A supplemental guide 23a is also preferably provided with which cooperates an extension 22a on the housing unit B, additional locking screw 24a being employed as shown.

Interposed between the housing units A and B is the lens and mounting therefor, the lens being indicated generally by the reference character L and the barrel in which mounted by the reference 25. The lens assembly is detachably but fixedly secured by means of the screws 26 extending through the lens flange 27 into the flange plate 28 which in turn is detachably but rigidly secured to the housing unit A as by the knurled screws 29—29. The opposite end, referenced 30 of the lens barrel is adapted to enter a corresponding opening or aperture in the adjacent wall of the housing unit B, as most clearly shown in Figure 3 and, in order to provide a light seal or closure when the units A and B and the lens L are in operative position, an annular felt ring 31 may be used to seal the gap between the lens barrel and the rim of the opening in which received, as fully shown in Figure 3. As customary, the lens unit is provided with a diaphram, the adjustment of which is controlled through the button 32 operating in the diaphram slot 33 as best shown in Figure 1.

In carrying out the invention, the housing unit B of the reverser is provided with a chamber 34 within which is located what may be termed the first incident mirror 35 of the series of reflecting mirrors. Said mirror 35, as shown in Figure 1 faces toward the copy and is inclined as there shown at an angle of 45° to the vertical such that, an image of the copy striking the mirror 35 is reflected vertically downward as indicated by dot and dash line and arrow 35a, to the second or intermediate mirror of the series indicated at 36. The mirror 36, as best shown in Figures 1 and 3, extends in a plane which is parallel to the axis of the camera and at the same time inclined at an angle of 45° to the horizontal as shown. The image, reflected from mirror 35, after striking the mirror 36 is again reflected at right angles horizontally and transversely to the axis of the camera directly into and through the lens as indicated by the dot and dash line 36a in Figure 3.

The reflected image, after having passed through the lens L impinges upon the third or final mirror 37 which is contained within the housing unit A. Said mirror 37, as clearly shown in Figures 3 and 5, extends in a vertical plane and one which is also disposed at 45° to the line passing from the copy to the negative or other sensitized element of the camera. The reflected image after passing through the lens, is in turn reflected by the mirror 37 at right angles to the line 36a, as indicated by the line 37a, horizontally, parallel to and in the same direction as the image initially transmitted from the copy to the mirror 35. As the image is ultimately emitted from the mirror 37, the same passes through an opening 38 in the unit A and a corresponding aligned opening 39 in the reverser mounting 20 and, as will be understood, through the usual lens opening in the lens board of the camera and thence to the negative or sensitized element.

Each of the mirrors 35, 36, and 37 is detachable and replaceable and each is held in desired fixed position by suitable means such as the bush pins 40—40 with which cooperate thumb nuts 41—41 similar to the construction disclosed in my said prior application 321,014. Attached to the housing unit B as by the hinges 42—42 is an exposure shutter 43 adapted to swing downwardly so as to close the opening leading to the mirror 35. Said shutter 43 also, as will be apparent, serves to protect the mirrors when the reverser is not in use.

As best shown in Figures 1 and 3, the housing unit B is provided with a slot which, as viewed in those figures, extends horizontally as indicated at 44 and within which slot is adapted to be removably and replaceably inserted a ghost image trap plate 45 having a finger piece 46 by which the same may be readily inserted and removed. As will be obvious said trap plate 45 is located between the mirrors 35 and 36 so as to trap or eliminate stray rays of light or so-called ghost images when the true images are being transmitted between the mirrors 35 and 36. The character of the apertures in the trap plate 45 will be varied to suit different conditions, all as more specifically pointed out in my prior application 321,014 and to which reference may be had for more detailed description of the ghost image trap plate.

With the image reverser as so far described, it will be evident that the lens is interposed between the intermediate mirror of the series of three mirrors, and one of the end mirrors of the series. Furthermore, since practically all commercial types of lenses used in process cameras are interchangeable, regardless of focal length, it is evident that my improved reverser permits of the use of lenses of different focal lengths and that one lens may be changed for another in a very few moments and without disturbing the operative relationship of reflecting mirrors and lens. The interchange of lenses, as hereinbefore described, is accomplished simply by relatively separating the housing units A and B and making the necessary substitution or interchange of lenses and then bringing the housing units A and B back into their initial operating condition as shown in Figures 1, 2, and 3. It will also be observed that by bringing the mirrors 36 and 37 directly opposite and as closely adjacent as is practically possible to the lens, the maximum area of images is obtained.

In the detailed description so far presented of the image reverser, the description has proceeded on the assumption that the mirror 35 is faced toward the copy which is to be reproduced on the negative and hence that the image of the copy will be reflected twice before passing through the lens. This is the manner in which the reverser will ordinarily be used when enlargements are desired and in which event the image reverser and its mounting will be secured to the front or outer side of the lens board as indicated at 50 in Figure 6 where the copy board is indicated at 51 and the negative or other sensitized element at 52. When, however, it is desired to obtain certain reductions and when using shorter focus lenses, the image reverser and its mounting will be secured to the inner side of the lens board of the camera as indicated at 50ª in Figure 7. In this arrangement of the image reverser, the image from the copy board 51 first impinges upon the mirror 37 and is then reflected and transmitted through the lens to the intermediate mirror 36 and from the latter in turn to the mirror 35 and ultimately from the latter is emitted to the negative or sensitized element 52. As will be apparent from the preceding description, the arrangement of the mirrors and lens is such that, regardless of whether the image from the copy initially strikes either the mirror 35 or the mirror 37, it is reflected by such incident mirror at right angles to the line in which the image moves originally from the copy to the incident mirror. Whether the first reflected image is first transmitted through the lens or strikes an intermediate mirror before being transmitted through the lens, the image is again reflected at right angles to the line of the first reflected image so that the two lines of the first and second reflected images define a plane which is perpendicular or normal to the line of the incident image from the copy to the incident mirror. From the second or intermediate mirror, whether the image reverser occupies a position as shown in Figure 6 or a position as shown in Figure 7, the final emitted image is reflected horizontally, parallel to and in the same direction as the initial image from the copy to the incident mirror.

Under some commercial conditions, it is necessary or desirable that the center of the copy be sometimes offset either above or below or to the right or to the left of the center line or axis of the camera. In order to meet such conditions practically, the improved image reverser may be mounted on the reverser mounting or board 20 and the latter swung to any desired angular position as indicated by the full and dotted lines in Figure 8 in which figure the housing unit A will be disposed with its mirror 37 opposite the usual lens opening in the lens board 60. The reverser mounting or board 20 with the image reverser proper carried thereon may be held in any desired annular position by any suitable means such as the knurled screws 61—61 engaging in suitable threaded openings provided in the lens board 60.

Under other conditions in commercial practice, it may be essential that the center of the copy be located exactly in the center line or axis of the camera. In such event it is essential that the center of the incident mirror of the reverser, as for instance the mirror 35 as shown in Figure 9, have its center also located in such center line or axis. In this arrangement it is apparent that the third or emitting mirror (37 in the particular instance under consideration) will be off center and suitable provision will therefore be necessary in locating the opening through the lens board of the camera so that the image may be transmitted to the negative. In order to provide for all desirable angular adjustments of the image reverser, the same may be mounted on a disc 63 rotatably mounted in an auxiliary supporting board 64, the disc being adapted to be held in any desired angular position as by the threaded pins 65 engageable in corresponding holes 66 in the auxiliary supporting board.

In Figures 8 and 9 the image reverser has been shown and described with the mirror 35 assumed to be the incident or first mirror to receive the image from the copy. It will be evident however that the image reverser may be used in the turned or reversed position so that the incident mirror is the mirror 37 and the mirror 35 is the final or emitting mirror, as described in connection with Figures 6 and 7.

From the preceding description, it will be seen that the improved image reverser insures that the lens will be held accurately and squarely in the path of the reversed image; that the improved reverser adequately meets all requirements for enlargement and reductions and use of lenses of varying focal lengths; that the lenses can be readily interchanged; and that the reverser may be readily adjusted to any desired angular position with reference to the center line or axis of the camera so as to provide for off center locations of the copy and/or off center impressions of the image on the negative or other sensitized element.

Although there has herein been shown and described what is now considered the preferred manner of carrying out the invention, the same is merely illustrative and not by way of limitation. All changes and modifications are contemplated that come within the scope of the claims appended hereto.

What is claimed is:

1. An image reverser for straight line cameras comprising, in combination: two separate housing units; an optical system consisting of a series of three reflecting mirrors disposed in said units, a single mirror in one unit and two mirrors in the other unit, said housing units having opposed and aligned apertures to engage opposite ends of a camera lens barrel; means for mounting said single mirror in its housing unit in a position closely facing the lens and intersecting the lens axis at about forty-five degrees; means for mounting the intermediate mirror of the series in the other housing unit in a position closely facing the lens and intersecting the lens axis at about forty-five degrees; means for mounting the third mirror of the series in said last named housing unit in a position offset from and facing the intermediate mirror at an angle of about forty-five degrees and in a plane parallel to the lens axis, said several mounting means and mirrors being also such that when the lens axis is positioned horizontally, the first named mirror of the series is in a vertical plane, the intermediate mirror at about forty-five degrees to the vertical and the last mirror of the series at about forty-five degrees to the vertical; and means for retaining said two housing units in position with the mirrors relatively disposed as set forth and with said first and intermediate mirrors adjacent the lens.

2. An image reverser for straight line cameras comprising, in combination: two separate housing units; an optical system consisting of a series of three reflecting mirrors disposed in said units, a single mirror in one unit and two mirrors in the other unit, said housing units having opposed and aligned apertures to engage opposite ends of a camera lens barrel; means for mounting said single mirror in its housing unit in a position closely facing the lens and intersecting the lens axis at about forty-five degrees; means for mounting the intermediate mirror of the series in the other housing unit in a position closely facing the lens and intersecting the lens axis at about forty-five degrees; means for mounting the third mirror of the series in said last named housing unit in a position offset from and facing the intermediate mirror at an angle of about forty-five degrees and in a plane parallel to the lens axis, said several mounting means and mirrors being also such that when the lens axis is positioned horizontally, the first named mirror of the series is in a vertical plane, the intermediate mirror at about forty-five degrees to the vertical and the last mirror of the series at about forty-five degrees to the vertical; a reverser base; means for attaching the housing units to said reverser base; and means for relatively adjusting the housing units toward and from each other in the line of the lens axis to thereby permit insertion, removal and interchange of lens barrels therebetween.

3. An image reverser for straight line cameras comprising, in combination: two separate housing units; an optical system consisting of a series of three reflecting mirrors disposed in said units, a single mirror in one unit and two mirrors in the other unit, said housing units having opposed and aligned apertures to engage opposite ends of a camera lens barrel; means for mounting said single mirror in its housing unit in a position closely facing the lens and intersecting the lens axis at about forty-five degrees; means for mounting the intermediate mirror of the series in the other housing unit in a position closely facing the lens and intersecting the lens axis at about forty-five degrees; means for mounting the third mirror of the series in said last named housing unit in a position offset from and facing the intermediate mirror at an angle of about forty-five degrees and in a plane parallel to the lens axis, said several mounting means and mirrors being also such that when the lens axis is positioned horizontally, the first named mirror of the series is in a vertical plane, the intermediate mirror at about forty-five degrees to the vertical and the last mirror of the series at about forty-five degrees to the vertical; a reverser base; means for attaching the housing units to said reverser base; a secondary base adapted to be attached to a camera lens board; and means rotatably securing the reverser base and attached housing units thereon to the secondary base to rotate in a plane parallel to the lens axis whereby to permit angular adjustment of the reverser as an entirety and the incident and emergent images thereof around the center line of the camera.

WILLIAM C. HUEBNER.